United States Patent
Gromyko et al.

(10) Patent No.: US 6,241,254 B1
(45) Date of Patent: Jun. 5, 2001

(54) DETACHABLE STATIONARY SEALING DEVICE

(75) Inventors: Boris Mikhailovich Gromyko; Evgeny Mikhailovich Matveev, both of Khimki; Jury Vasilievich Mitjukov; Igor Alexandrovich Mikhalev, both of Moscow, all of (RU)

(73) Assignee: Otkrytoe Aktsionernoe Obschestvo "Nauchno-Proizvodstvennoe Obiedinenie "Energomash"Imeni Akademika V.P. Glushko", Khimki (RU)

( * ) Notice: Subject to any disclaimer, the term of this patent is extended or adjusted under 35 U.S.C. 154(b) by 0 days.

(21) Appl. No.: 09/419,706

(22) Filed: Oct. 14, 1999

(30) Foreign Application Priority Data

Mar. 1, 1999 (RU) .................................. 99103737

(51) Int. Cl.$^7$ .............................. F16L 17/03; F16L 17/08
(52) U.S. Cl. .......................... 277/614; 277/624; 277/626; 277/926; 285/110; 285/368
(58) Field of Search ...................... 277/602, 608, 277/609, 614, 616, 619, 624, 626, 926, 928; 285/379, 380, 368, 334.1, 332.1, 110, 111, 374

(56) References Cited

U.S. PATENT DOCUMENTS

| | | | | |
|---|---|---|---|---|
| 3,520,541 | * | 7/1970 | Rohani | 277/11 |
| 4,279,425 | * | 7/1981 | Beacom | 277/207 |
| 4,648,632 | * | 3/1987 | Hagner | 285/344.1 |

* cited by examiner

Primary Examiner—Anthony Knight
Assistant Examiner—Matthew E. Rodgers
(74) Attorney, Agent, or Firm—Cherskov & Flaynik

(57) ABSTRACT

The invention relates to the sealing of detachable joints of the pipelines and manifolds by using metal elastic gaskets. A detachable stationary sealing device comprises the flanges having sealing surfaces, being tapered for one of the flanges and concave for another, a sealing gasket and a retaining releasing ring. The gasket is provided with elastic tabs being in contact with the sealing surfaces of the flanges, and an annular projection, the inner cylindrical surface of which is in contact with the outer cylindrical surface. The retaining releasing ring is of C-shaped cross-section and is fixed in the annular groove made on said cylindrical surface of the flange. The annular projection of the gasket is provided with the transversal external projection that fits into the groove of the retaining ring. The use of the invention reduces dimensions while increasing its reliability.

20 Claims, 2 Drawing Sheets

US 6,241,254 B1

DETACHABLE STATIONARY SEALING DEVICE

FIELD OF THE INVENTION

The invention relates to the sealing techniques and concerns the sealing of detachable stationary joints of pipelines and manifolds by using the metal elastic gaskets in particular.

BACKGROUND OF THE INVENTION

It is known a detachable sealing device that contains flanges with the contact surfaces of curvilinear or tapered shape, between which a metal gasket with elastic tabs and a rigid peripheral portion are mounted, a cylinder mounting surface for a fixing annular projection of the gasket peripheral part being made in one of the flanges, and an annular groove, in which a retaining releasing ring preventing the gasket against the axial shift during the flange joint is mounted, being made in the flange from the side of one of the gasket tabs (SU, No. 1499032, Cl. F 16 J 15/02, published on Aug. 4, 1989).

The device is intended for the operation within a broad pressure and temperature range in the medium of corrosive components with simultaneous action of vibration and dynamic loads.

The disadvantage of this device is the location of the retaining releasing ring in the bottom working part of the flange. The ring is mounted in the groove with radial and axial gaps, so friction of the retaining ring surfaces and the groove surface is possible in the case of strong vibrations, that may cause the ignition of the joint elements under the conditions of high temperature and presence in the medium of corrosive components.

Besides, such location of the retaining ring at a given diameter of the flange mounting surface and estimated length of the gasket peripheral part cause the necessity to make the length of elastic tabs shorter, that at other conditions being equal decreases their compliance required for the compensation of the joint gap providing the given level of tightness.

SUMMARY OF THE INVENTION

The object of the present invention to provide improvement of the quality and reliability of a construction in which a retaining releasing ring is mounted above the gasket from the fixing annular projection side, and consists in the following:

reduction of the joint overall dimensions by using the place released due to the absence of a shoulder for the retaining ring, that allows to make a gasket sealing surface to have a smaller diameter;

reliability improvement due to accomodation of the place of friction of the flange and retaining ring surfaces outside the component flow path and due to reducing the possible joint gap by increasing its stiffness associated with reducing the diameter of the flanges;

increase of the device sealing ability by providing a possibility to select an optimum length for the gasket elastic tabs.

For solving the object stated and achieving the technical result, a detachable stationary sealing device comprising:

flanges mounted on a pipeline, the first of which is made with a tapered surface and with an outer cylinder surface, and the second of which is made with a concave surface facing said tapered surface of the first flange;

a gasket located between said flanges, one part of the surface of which has a convex form and is conjugated with the concave surface of the second flange, and another part of the surface of which has a tapered form and is conjugated with the tapered surface of said first flange, the gasket end facing the pipeline axis being provided with a U-shaped groove, and the opposite end of the gasket being provided with an annular projection, the inner surface of which is placed on the outer cylinder surface of said first flange;

the retaining releasing ring intended for fixing the gasket, that has a C-shaped cross-section and is placed in the groove made on the mounting cylinder surface of said first flange, and the annular projection of said gasket is provided with a transversal external projection that is mounted inside said retaining releasing ring.

Additional embodiments of the device are possible, in which it is advisable that:

the transversal external projection of the gasket annular projection is made with a tapered outer surface, and the larger base of the tapered surface is mounted with possibility of its straddling by the Γ-shaped part of the C-shaped retaining releasing ring, that is located above the annular projection of the gasket;

the gasket part thickness near the base of U-shaped groove is less than the thickness of the gasket part having tapered and convex surfaces with a possibility to put a gasket into the elastic tabs form in its longitudinal section;

the ends of elastic tabs are provided with the projections of toroidal shape;

the gasket is provided with by-pass holes located above the U-shaped groove made in the gasket part of less thickness;

the angle of the gasket tapered surface generatrix is selected to be equal to or larger than the angle of the flange tapered surface generatrix;

the radius of curvature of the gasket convex surface is selected to be equal to or less than the radius of curvature of the second flange concave surface;

bolts are used additionally for connecting the flanges above the outer surfaces of the retaining releasing ring and the gasket.

BRIEF DESCRIPTION OF THE DRAWINGS

The said advantages and distinctive features of the invention will appear more clearly from its preferred embodiment, with the reference to the accompanying drawings, in which.

BRIEF DESCRIPTION OF THE PREFERRED EMBODIMENT

Figure 1:
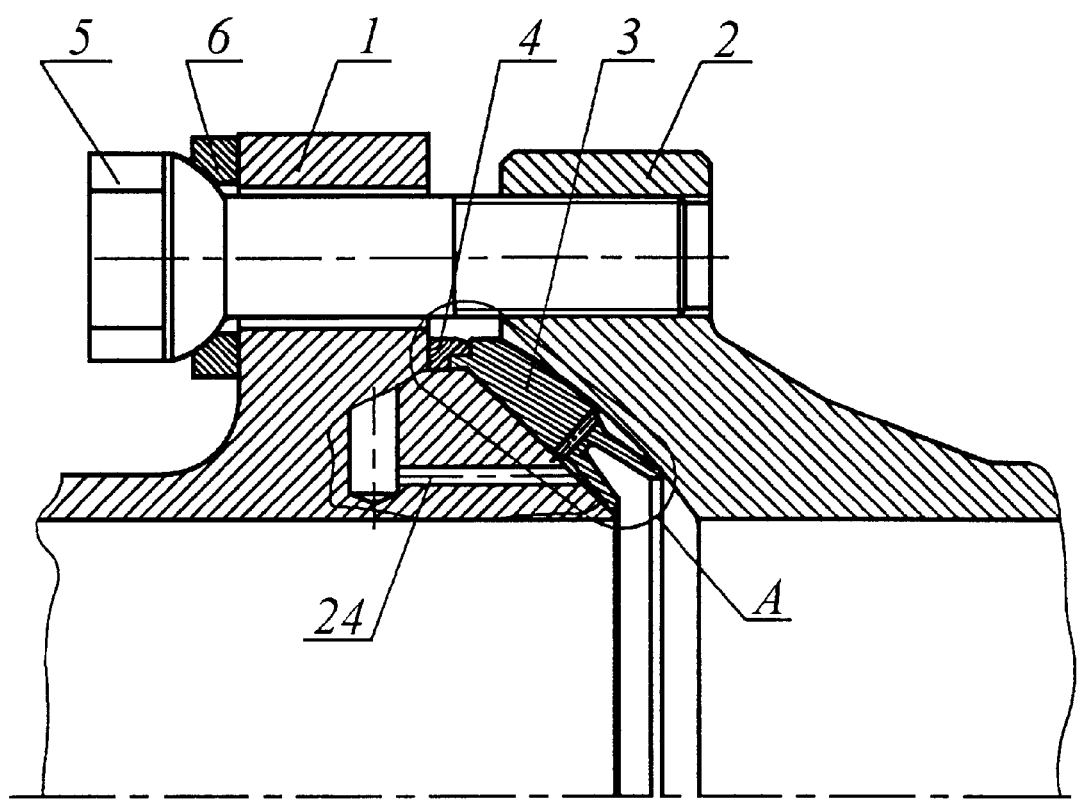
FIG. 1 is a longitudinal (along the pipeline axis) sectional view of the device design after the joint tightening.

Referring to FIG. 1, the device consists of the flanges 1 and 2, a gasket 3, a retaining releasing ring 4, bolts 5 with spherical heads and washers 6 with spherical recesses for the heads.

Figure 2:
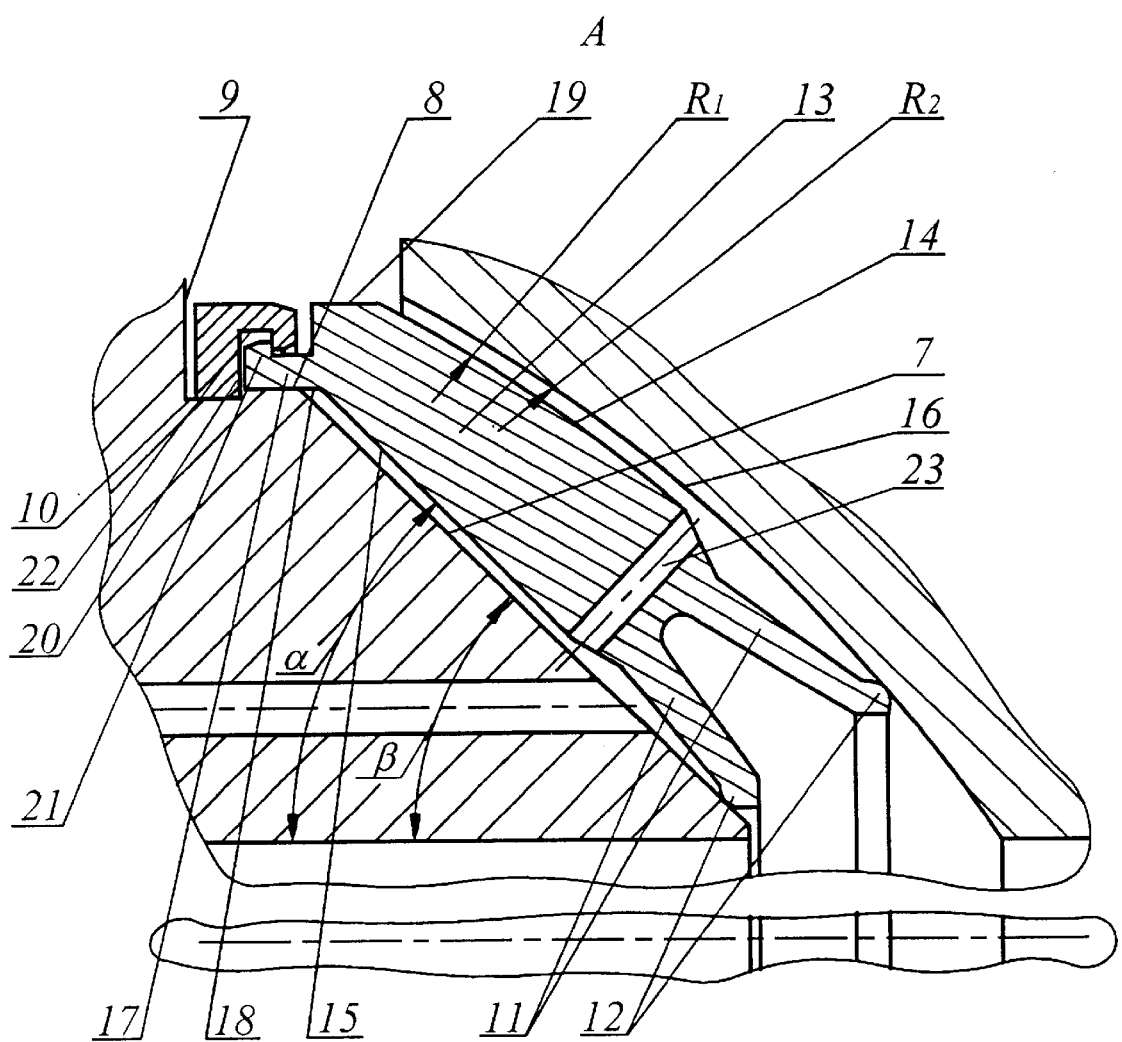
FIG. 2 is the detail A of FIG. 1, presented in the enlarged scale, for the same device but before the joint tightening.

A surface 7 of tapered shape, a mounting cylindrical surface 8, an end surface 9 and a groove 10 for the retaining releasing ring 4 (FIG. 1) are made on the flange 1 (FIG. 2).

The gasket 3 comprises elastic tabs 11 (FIG. 2) with the annular sealing projections 12 of toroidal shape and a peripheral ring 13 with the sealing surfaces: an outer convex surface 14 with radius R1 and an inner tapered surface 15.

For the seal improvement, the surfaces 7 and 15 are made with different angles β and α (in this case α≧β). The flange 2 has a concave surface 16 with radius R2; radius R1 may be selected less than or equal to radius R2. An annular projection 17 is made on the peripheral ring 13 at the gasket 3 end from the larger diameter side. The inner surface of this projection is placed on the mounting cylindrical surface 8 of the first flange 1. Said projection also comprises an inner entry-aligning surface 18, an outer cylindrical surface 19 and an end surface 20, on which a transversal external projection 21 is made that fits into the internal annular groove 22 of the retaining releasing ring 4 (FIG. 2).

By-pass holes 23 are made in the gasket 3 between the barriers of the seal formed by the seal projections 12 and the seal surfaces 14 and 15. A channel 24 (FIGS. 1,2) with a connection at its end (not shown) is provided on the flange 1 for releasing the leakage.

A soft sealing covering (copper, silver, fluoroplastic, etc.) is applied to all sealing surfaces of the gasket 3.

The device (FIGS. 1,2) operates in the following way.

First of all, a retaining releasing ring 4 is mounted on the flange 1. This ring is fixed in the groove 10 of the flange. After that, a gasket 3 is mounted on the flange 1 and is centered by its entry-aligning surface 18 of the annular projection 17 along the mounting cylindrical surface 8 of the flange 1. At subsequent displacement of the gasket 3 along the joint axis, the tapered transversal external projection 21 of the gasket 3 goes in contact with the entry facet of the retaining releasing ring 4, unclasps it and is fixed by the transversal external projection 21 in the internal groove 22 of the ring 4. After that, a flange 2 is mounted on the gasket 3 and the device is tightened by the bolts 5. Sequential straddling of the elastic tabs 11 and elastic deformation of the peripheral ring 13 of the gasket 3 and flange 2 take place while tightening until reaching a full contact the sealing surfaces 14 and 15 of the gasket 3 with the surfaces 16 and 7 of the flanges. In this case, the entry-aligning surface 18 of the annular projection 17 displaces along the mounting cylindrical surface 8 of the flange 1.

Guaranteed gaps should be provided in the final position between the end 9 of the flange 1, the ends of the retaining releasing ring 4 and the end 20 of the gasket 3.

Under supply of the pressure of the sealed medium due to the self-sealing effect, the contact pressure on the sealing surfaces of the projections 12 of the elastic tabs 11 increases. In this case, due to displacement of the elastic gasket 3 in the radial direction under the internal pressure action together with the mounting surface narrowing to the device periphery, the contact pressure on the sealing surfaces 14 and 15 of the gasket 3 also increases. The sustaining of the required contact pressure on the sealing surfaces at possible joint disconnection during the device operation is provided by the elastic recoil of the tabs 11 and turn of the section of the peripheral ring 13 of the gasket 3 back to the initial position, the longer the tabs 11 are the higher their elasticity and self-sealing effect are, i.e. the higher is the sealing ability of the device.

The invention aims at providing the sealing for stationary joints of pipelines and manifolds through which a high-temperature oxidizing fluid is transported. This device may be used in the manifolds of liquid-propellant rocket engines.

We claim:

1. A detachable stationary sealing device comprising:
    (a) flanges mounted on a pipeline, the first of which is made with a tapered surface and with a mounting cylindrical surface, and the second of which is made with a concave surface facing said tapered surface of the first flange;
    (b) a gasket located between said flanges, one part of the surface of which has a convex form and is conjugated with the concave surface of the second flange, and another part of the surface of which has a tapered form and is conjugated with the tapered surface of said first flange, the gasket end facing the pipeline axis being provided with a U-shaped groove, and the opposite end of the gasket being provided with an annular projection, the inner surface of which is placed on the outer cylinder surface of said first flange;
    (c) a retaining releasing ring intended for fixing the gasket, that has a C-shaped cross-section and is placed in the groove made on the mounting cylinder surface of said first flange, and the annular projection of said gasket is provided with a transversal external projection that is mounted inside said retaining releasing ring.

2. A detachable stationary sealing device as set forth in claim 1, wherein the transversal external projection of the gasket is made with a tapered outer surface, and the larger base of the tapered surface is mountable such as to straddle a Γ-shaped part of said C-shaped retaining releasing ring, located above the annular projection of said gasket.

3. A detachable stationary sealing device as set forth in claim 1, wherein the thickness of said gasket part near the base of the U-shaped groove is less than the thickness of the gasket part having tapered and convex surfaces so that fluid pressure from said pipeline can contact the tabs and increase the sealing of the tabs.

4. A detachable stationary sealing device as set forth in claim 3, wherein the ends of said elastic tabs are provided with the projections of toroidal shape.

5. A detachable stationary sealing device as set forth in claim 3, wherein the gasket is provided with by-pass holes located above the U-shaped groove made in the gasket part of less thickness.

6. A detachable stationary sealing device as set forth in claim 1, wherein the angle of the gasket tapered surface generatrix is equal to or larger than the angle of the flange tapered surface generatrix.

7. A detachable stationary sealing device as set forth in claim 1, wherein the radius of curvature of the gasket convex surface is equal to or less than the radius of curvature of the second flange concave surface.

8. A detachable stationary sealing device as set forth in claim 1, wherein the bolts additionally are used for connecting the flanges above the outer surfaces of the retaining releasing ring and the gasket.

9. A detachable stationary sealing device comprising:
    (a) a generally circular first flange mounted at a first end of a first conduit, said first flange defining a tapered surface terminated at its periphery by a flat annular surface;
    (b) a generally circular second flange mounted at a second end of a second conduit, wherein the first conduit and the second conduit are arranged co-linearly so that the first end and the second end oppose each other, said second flange defining a concave surface facing said tapered surface;
    (c) a gasket intermediate said flanges, said gasket defining a first surface complementary to the tapered surface, a second surface complementary to the concave surface, a U-shaped projection angularly extending toward said second flange, and an annular portion extending toward first flange, whereby the annular portion has a first surface in communication with the flat annular surface of the first flange; and (d) a gasket retaining means contacting a second outwardly facing surface of the annular projection of said gasket and wherein the annular projection of said gasket defines a radially extending portion encapsulated by said retaining means.

10. The device as recited in claim 9 wherein the retaining means has a C-shaped cross section.

11. The device as recited in claim 10 wherein the retaining means contacts the annular projection of the gasket at a point proximal from the radially extending region of the gasket.

12. The device as recited in claim 9 wherein the U-shaped projection terminates in torroidal-shaped tips.

13. The device as recited in claim 9 wherein said gasket and said flanges define an annular space.

14. The device as recited in claim 13 wherein the gasket contains a region forming an aperture to facilitate fluid communication between the flanges.

15. The device as recited in claim 13 wherein the gasket contains a means for transporting fluid in and out of said annular space.

16. The device as recited in claim 13 wherein the first flange contains a means for transporting fluid in and out of said annular space.

17. The device as recited in claim 9 wherein the U-shaped projection contains extensions which reversibly converge when an axially and medially directed force is applied to said flanges.

18. The device as recited in claim 9 wherein the first surface of the gasket defines an angle of taper that is equal to or larger than an angle of the tapered surface of the first flange and wherein the second surface of the gasket defines a convex surface having a radius of curvature that is equal to or less than the radius of curvature of the concave surface of said second flange.

19. The device as recited in claim 9 wherein said first flange contains a radially extending portion which forms a first threaded aperture and said second flange contains a radially extending portion which forms a second aperture coaxial with the first aperture.

20. The device as recited in claim 19 wherein the apertures threadably receive a bolt, whereby the bolt is juxtaposed lateral to the retaining means and extends in a direction perpendicular to a plane formed by the retaining means.

* * * * *